United States Patent [19]
Steinberg et al.

[11] Patent Number: 5,608,584
[45] Date of Patent: Mar. 4, 1997

[54] RECOGNITION OF TAPE RECORDING MEDIA TYPE USING PLURAL IN-LINE HOLES

[75] Inventors: Mitchell R. Steinberg, Upton; George A. Saliba, Northborough, both of Mass.

[73] Assignee: Quantum Corporation, Milpitas, Calif.

[21] Appl. No.: 450,753

[22] Filed: May 25, 1995

[51] Int. Cl.⁶ .................................................. G11B 15/08
[52] U.S. Cl. ...................................... 360/69; 360/74.6
[58] Field of Search ........................... 360/69, 74.6, 71; 235/458, 476, 480

[56] References Cited

U.S. PATENT DOCUMENTS

| | | | |
|---|---|---|---|
| 4,843,490 | 6/1989 | Haragushi | 360/69 |
| 4,863,114 | 9/1989 | Moeller et al. | 360/74.6 X |
| 5,327,305 | 7/1994 | Thomas | 360/74.5 |
| 5,448,426 | 9/1995 | Dahlerud | 360/69 |

FOREIGN PATENT DOCUMENTS 57-191810  11/1982  Japan ......................... 360/69

*Primary Examiner*—Aristotelis Psitos
*Assistant Examiner*—James L. Habermehl
*Attorney, Agent, or Firm*—David B. Harrison

[57] ABSTRACT

A single reel tape cartridge includes a type of magnetic recording tape having characteristics which are identified to a cartridge tape handling system in accordance with size variation of a tape type hole following a beginning of tape (BOT) hole by a predetermined, qualifying distance. A cartridge tape handling system for identifying the particular tape type, and for formatting the tape in accordance with determined tape type is also described.

14 Claims, 4 Drawing Sheets

RECOGNITION OF TAPE RECORDING MEDIA TYPE USING PLURAL IN-LINE HOLES

FIELD OF THE INVENTION

The present invention relates to a single reel magnetic tape cartridge in which the magnetic tape spooled therein includes a tape-type hole following a beginning of tape hole, thereby identifying a media type of the particular tape contained in the cartridge for enabling appropriate magnetic formatting and use thereof.

BACKGROUND OF THE INVENTION

In order to provide automatic detection of ends of lengths of magnetic tape within a tape handling cartridge system, beginning of tape (BOT) and end-of-tape (EOT) apertures or holes have been formed in the tape. These holes have been sensed optically, e.g. U.S. Pat. Nos. 4,843,490; 4,863,114; and, U.S. Pat. No. 5,327,305; in order to determine cartridge type, tape type, format, etc.

In some tape cartridge systems, such as the one described in U.S. Pat. No. 4,863,114, the tape handling system does not access either the feed reel or the take-up reel, so it is not possible to measure relative rotational velocities at those reels to determine whether a particular hole represents a BOT or EOT aperture. Accordingly, fairly complex patterns of longitudinally and transversely positioned holes have been required to provide for a positive identification of BOT and EOT to the tape handling system.

The BOT and EOT hole patterns are provided by the tape cartridge manufacturer in order to identify the tape thickness, maximum magnetic recording density, coercivity, cartridge type, etc. One reason for differentiating between tape media and cartridges is the continuing trend to increase the coercivity of tape media, while at the same time reducing tape web thicknesses. These variations create the likelihood that a wide variety of cartridge/tape characteristics will be presented to the tape handling system. Before a cartridge tape is formatted and used, the only format information available to the tape handling system comprises BOT and EOT hole sequences. The tape handling system detects the sequences optoelectrically, determines tape/cartridge type from the sequence, and formats and uses the tape/cartridge accordingly.

In the example provided in U.S. Pat. No. 4,863,114, the sequence of holes following an initial BOT or EOT hole was coded to provide a binary code in which "1"s and "0"s were indicated by the presence or absence of holes within the sequence. This arrangement was said to provide a virtually unlimited amount of identification data to the tape handling system. However, it required an extensive and precise tape perforation operation at the time of cartridge assembly. Furthermore, the provision of holes displaced laterally (vertically) as well as longitudinally (horizontally) required a complex optical sensor array capable of sensing holes at various positions across the tape web. Also, the provision of many holes within relatively short segments of the tape tended to result in localized weakening of the tape structurally, leaving it susceptible to stretching or tearing in the event the handling system over-tensioned the tape at the vicinity of the holes.

In the example provided in U.S. Pat. No. 4,843,490, two different tape types were determined based upon sensed distance of a tape-type (TT) hole from a BOT hole. While this system worked well for identifying a few tape types (two types were preferred in the '490 patent), it required precise tape velocity measurement, and no mechanism was provided to verify or qualify the TT hole as being valid, and therefore reliable.

Thus, a hitherto unsolved need has remained for an improved, yet vastly simplified method and arrangement for typing particular tapes and cartridges for use within a tape handling system.

SUMMARY OF THE INVENTION WITH OBJECTS

A general object of the present invention is to provide an improved and simplified method and arrangement enabling determination of a type of magnetic media from a series of available types within a tape drive assembly in a manner overcoming limitations and drawbacks of the prior art.

A more specific object of the present invention is to provide a tape type hole of predetermined particular size at a predetermined short distance from a BOT hole, the size of the tape type hole indicating the particular magnetic tape type.

Another specific object of the present invention is to provide a tape drive subsystem for determining a particular tape type based upon size of a tape type hole sensed at a predetermined distance following a sensed BOT hole.

A further specific object of the present invention is to provide a universal tape cartridge which may be employed to contain a spool of tape, wherein the tape may have a variety of tape thicknesses and magnetic storage properties, and further to provide a simple and efficient mechanism to identify the particular tape type actually present within the tape cartridge.

In accordance with one facet of the present invention, a method is provided for detecting one of a plurality of types of magnetic media tape within a magnetic tape cartridge data storage subsystem, wherein the tape cartridge includes a tape feed reel having the one type of magnetic tape spooled thereon, wherein beginning of tape (BOT) and end of tape (EOT) holes are defined by the tape near respective ends thereof, and wherein the subsystem receives the cartridge, engages a BOT end of the tape and spools the tape onto an internal take-up reel, measures tape velocity, measures take-up reel velocity and senses at least the BOT hole. The new method comprising the steps of:

a. defining a single tape type (TT) hole at a predetermined location horizontally aligned with, and proximately close to and inside of, the BOT hole, the location for qualifying the TT hole, and the size of the TT hole determining tape type, b. sensing the BOT hole, c. measuring a distance from the BOT hole to the TT hole to qualify the TT hole as valid, d. sensing and measuring a duration of the TT hole as a function of its size to determine tape type, and e. formatting the tape with the subsystem in accordance with determined tape type.

In accordance with another facet of the present invention, a single reel tape cartridge is provided for supplying one of a plurality of types of magnetic recording tape into a magnetic tape cartridge data storage subsystem. The tape cartridge includes a tape feed reel having the one type of magnetic tape spooled thereon. Beginning of tape (BOT) and end of tape (EOT) holes are defined by the tape near respective ends thereof. The tape drive subsystem receives the cartridge, engages a BOT end of the tape, spools the tape onto an internal take-up reel, measures tape velocity, measures take-up reel velocity and senses at least the BOT hole. In this facet of the invention, the cartridge comprises:

a tape type (TT) hole defined by the tape adjacently inside of the BOT hole and in substantial alignment with a longitudinal axis of alignment of the BOT hole and spaced away therefrom, spacing between the BOT hole and the TT hole serving to qualify the TT hole as valid, the TT hole being defined by the tape to have a size in relation to the BOT hole in order to indicate said one tape type.

In accordance with a further facet of the present invention, a cartridge tape data storage and retrieval subsystem records and plays back digital user data from a formatted data storage tape of one of a plurality of tape types. In this subsystem the tape cartridge includes a tape feed reel having the one type of magnetic tape spooled thereon, the tape defining a beginning of tape (BOT) hole and an end of tape (EOT) hole near respective ends of the spooled tape. The subsystem further includes structural elements for receiving the cartridge, for engaging a BOT end of the tape, for spooling the tape onto an internal take-up reel, for measuring tape velocity, for measuring take-up reel velocity and for sensing the BOT and EOT holes. The subsystem further comprises:

a measurement circuit responsive to the structural element for sensing the BOT hole for measuring a distance to a tape type (TT) hole defined by the tape adjacently inside of the BOT hole and spaced away therefrom along a longitudinal tape axis with which the BOT hole is substantially centered, for generating a TT hole location value, a qualification circuit responsive to the measurement circuit for comparing the TT hole location value with a reference value to qualify the TT hole as valid, a TT hole duration measurement circuit responsive to the qualification circuit for sensing a duration of the TT hole via the structural element for measuring the BOT hole and for generating a TT hole duration value, and a tape type determining circuit for comparing the TT hole duration value with a plurality of prestored TT hole duration reference values, thereby to determine tape type of the one type of magnetic tape.

As a related aspect of this facet of the invention, the cartridge tape subsystem includes a tape format circuit responsive to the tape type determining circuit for formatting the said one type of magnetic tape in response to determined tape type.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
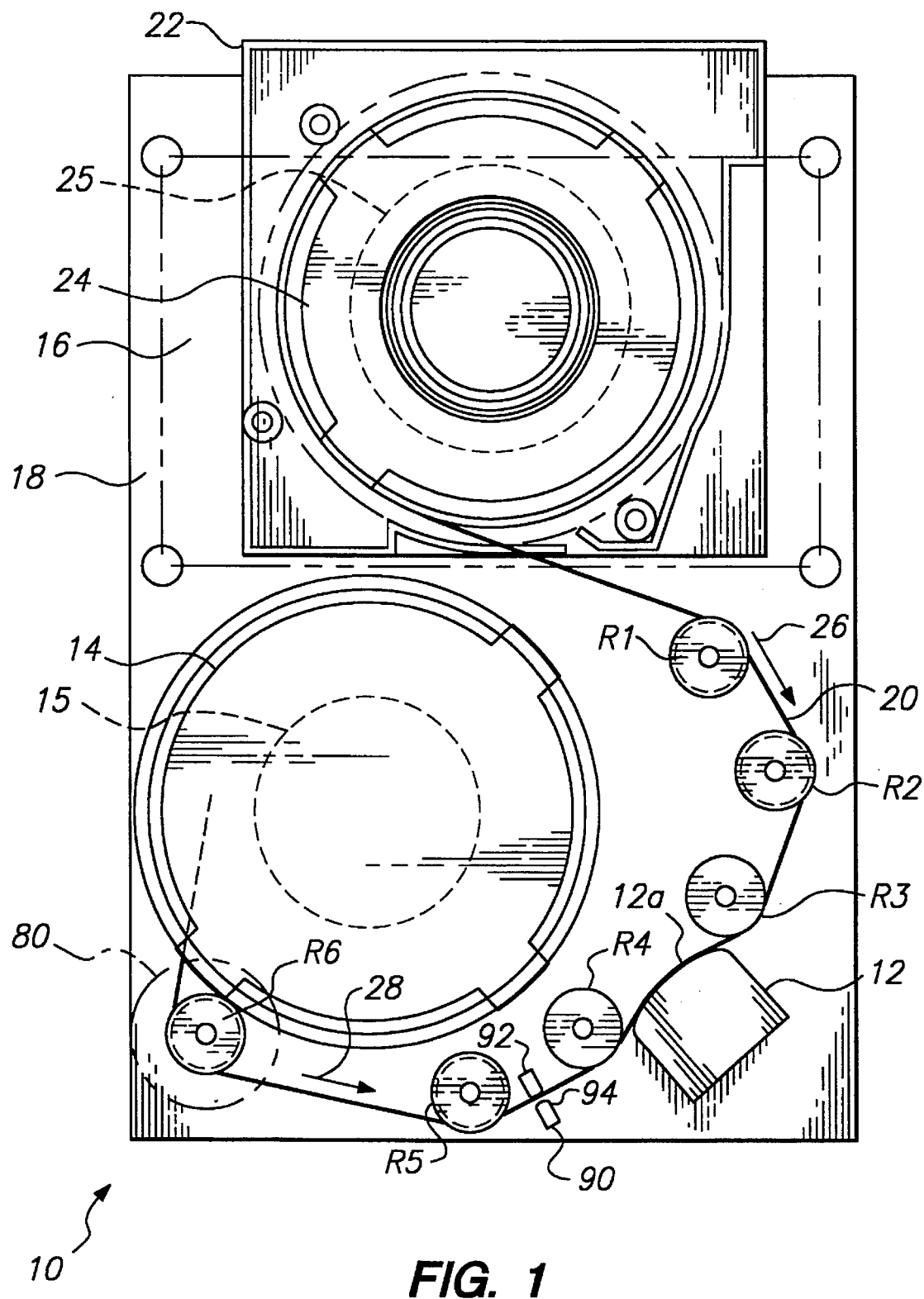
FIG. 1 is a diagrammatic plan view of an exemplary cartridge tape and tape handling system employing principles of the present invention.
Figure 2:
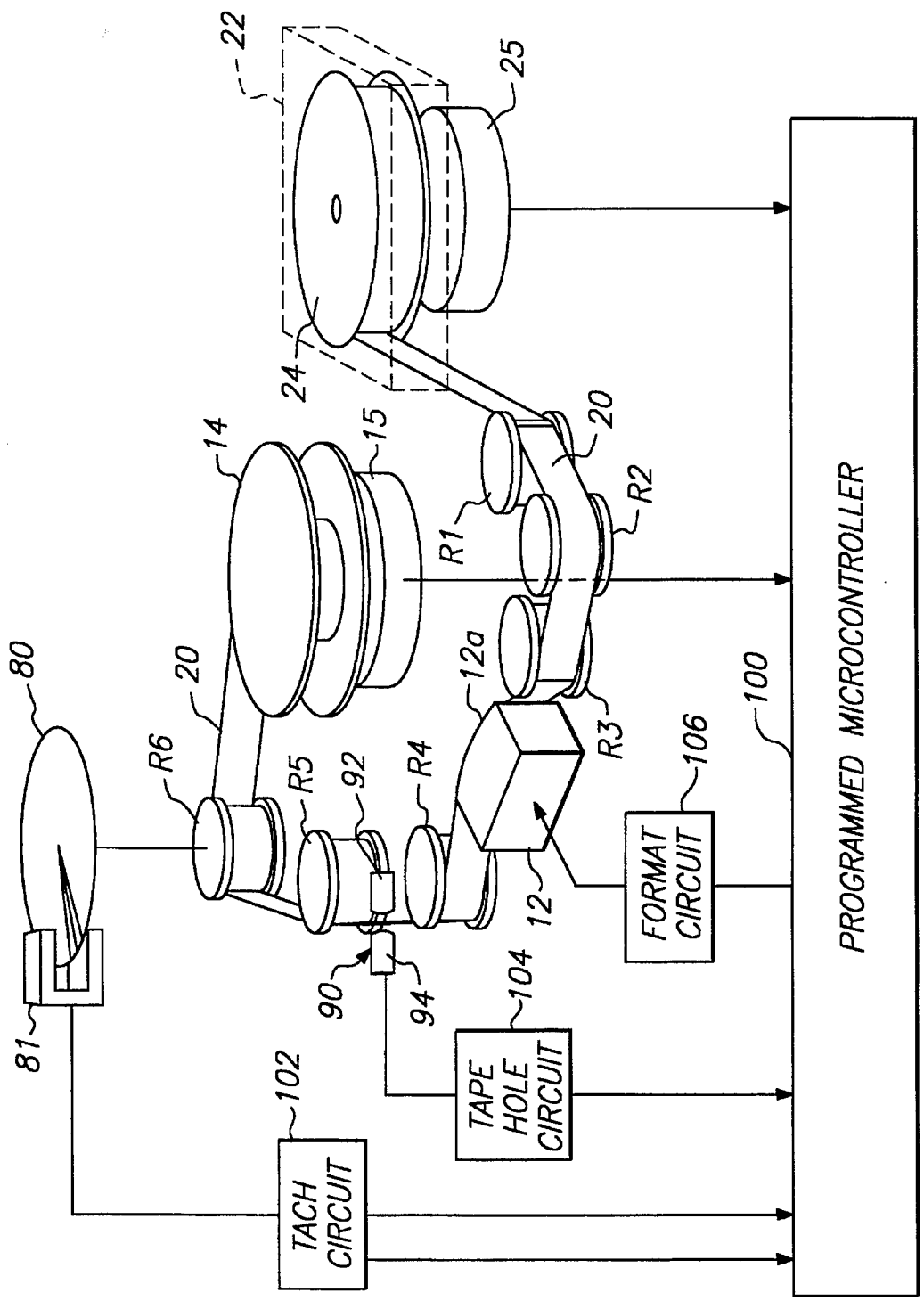
FIG. 2 is a structural/electrical block diagram illustrating structural mechanical and electrical features of the FIG. 1 example of the present invention.

A tape drive assembly 10 is shown in the FIG. 1 plan view, and in the FIG. 2 diagrammatic system view. The assembly 10 includes a tape head 12, an internal take-up reel 14 driven by a take-up reel drive motor 15, and a tape cartridge receiver 16. These elements are contained within a housing 18. Magnetic recording tape 20 of a predetermined particular type is provided to tape drive assembly 10 by insertion of a cartridge 22 into the tape cartridge receiver 16. After being engaged by a buckling mechanism of the type described in commonly assigned U.S. Pat. No. 4,720,913 for "Mechanism for Joining Tape Leaders" (the disclosure thereof being incorporated herein by reference), the tape 20 is spooled off of a cartridge supply reel 24, with an outermost tape leader being wound onto the internal take-up reel 14.

The tape cartridge receiver 16 includes a supply reel drive motor 25 which engages and drives supply reel 24 when the cartridge 22 is loaded into the cartridge receiver 16. The motors associated with reels are driven by a motor control circuit (not shown) such as the circuit described in the present coinventors' commonly assigned U.S. Pat. No. 5,216,556 for "Method for Optimized Tape Tension Adjustment for a Tape Drive", the disclosure thereof being incorporated herein by reference.

It is conventionally necessary to constrain the tape 20 against lateral (up and down) movement as it traverses a face 12a of the magnetic head assembly 12 in order to keep the parallel data tracks defined on the tape 20 in alignment with transducing elements carried within the head assembly 12. It is also necessary to maintain the tape 20, which may be of varying thickness, depending upon the particular plastic substrate, very flat against the transducing face 12a of the head assembly 12. Accordingly, in a preferred embodiment a series of six tape guide rollers are used to constrain 0.5 inch wide tape (of predetermined varying thicknesses) in place across the head structure 12. These rollers are shown in FIGS. 1 and 2 as rollers R1, R2, R3, R4, R5 and R6. Presently preferred embodiments of the rollers R1–R6 are set forth in commonly assigned U.S. Pat. No. 5,173,828 for "Compact Multiple Roller Tape Guide Assembly", and in commonly assigned U.S. Pat. No. 5,414,585 for "Rotating Tape Edge Guide", the disclosures thereof being incorporated herein by reference.

The tape path extends longitudinally from the supply reel 24 within the cartridge 22, across an outside face of each of rollers R1, R2 and R3, across the head transducing face 12a, along the outside face of each of rollers R4, R5 and R6 and to internal take-up reel 14. In general the tape 20 may be driven in either forward direction 26 or reverse direction 28 to write data onto selected data track locations, or to read data from selected data tracks, of the tape 20. The tape 20 is rewound in reverse direction 28 back onto supply reel 24 before tape 20 in the tape cartridge may be released and withdrawn from the tape drive assembly 10.

One of the tape guide rollers, roller R6 is coupled to an optical tachometer encoder disk 80 which generates signal patterns in relation to actual tape velocity in the forward 26 and reverse 28 tape directions. A tachometer module 81 generates a collimated light beam which passes through the encoder disk 80 to a photodetector array which puts out electrical signals in quadrature relationship indicative of both velocity and direction of movement of the tape 20. A preferred form of tachometer roller R6 is given in commonly assigned U.S. Pat. No. 5,088,172 for "Tape Drive Assembly with Non-Slip Tachometer Roller", the disclosure thereof being incorporated herein by reference.

A second optical sensing module 90 including a light source 92 and collimated photodetector 94 is positioned between tape guide rollers R4 and R5. The sensing module directs a light beam at the tape in longitudinal alignment with BOT and EOT holes which are defined in the tape 20 and which are used by the tape drive assembly 10 to reverse the direction of movement of the reels 14 and 24, or to reduce streaming speed, in the event that the leader is being spooled from the take-up reel onto the supply reel 24 during a tape unthreading operation, during which the buckling mechanism is released, thereby facilitating removal of the tape cartridge 22. Typically, the BOT and EOT holes are defined at locations near the respective ends of the strand of tape 20 coiled on the supply reel 24, such as at locations approximately 27 feet respectively from each end.

Since the tape drive assembly 10 receives rotational velocity inputs from the take up reel motor 15, the supply reel motor 25 and the encoder wheel 80, by spooling relatively short lengths of tape, the assembly can measure the change in velocity at e.g. the take up reel motor 15 in relation to tape velocity measured at the encoder wheel 80 in order to determine tape thickness.

As shown in FIG. 2, in accordance with aspects of the present invention, the tape drive assembly 10 also includes a programmed microcontroller 100 which is connected to a tachometer circuit 102 coupled to the tachometer optoelectronic module 81, a tape hole circuit 104 which is coupled to the tape hole optoelectronic module 90, a tape format circuit 106 for formatting data tracks via write transducers included within the tape head assembly 12, and to sense velocity of the take-up reel motor 15 and velocity of the supply reel motor 25. These connections are shown diagrammatically in FIG. 2 by paths leading to and from the microcontroller 100.

Figure 3:
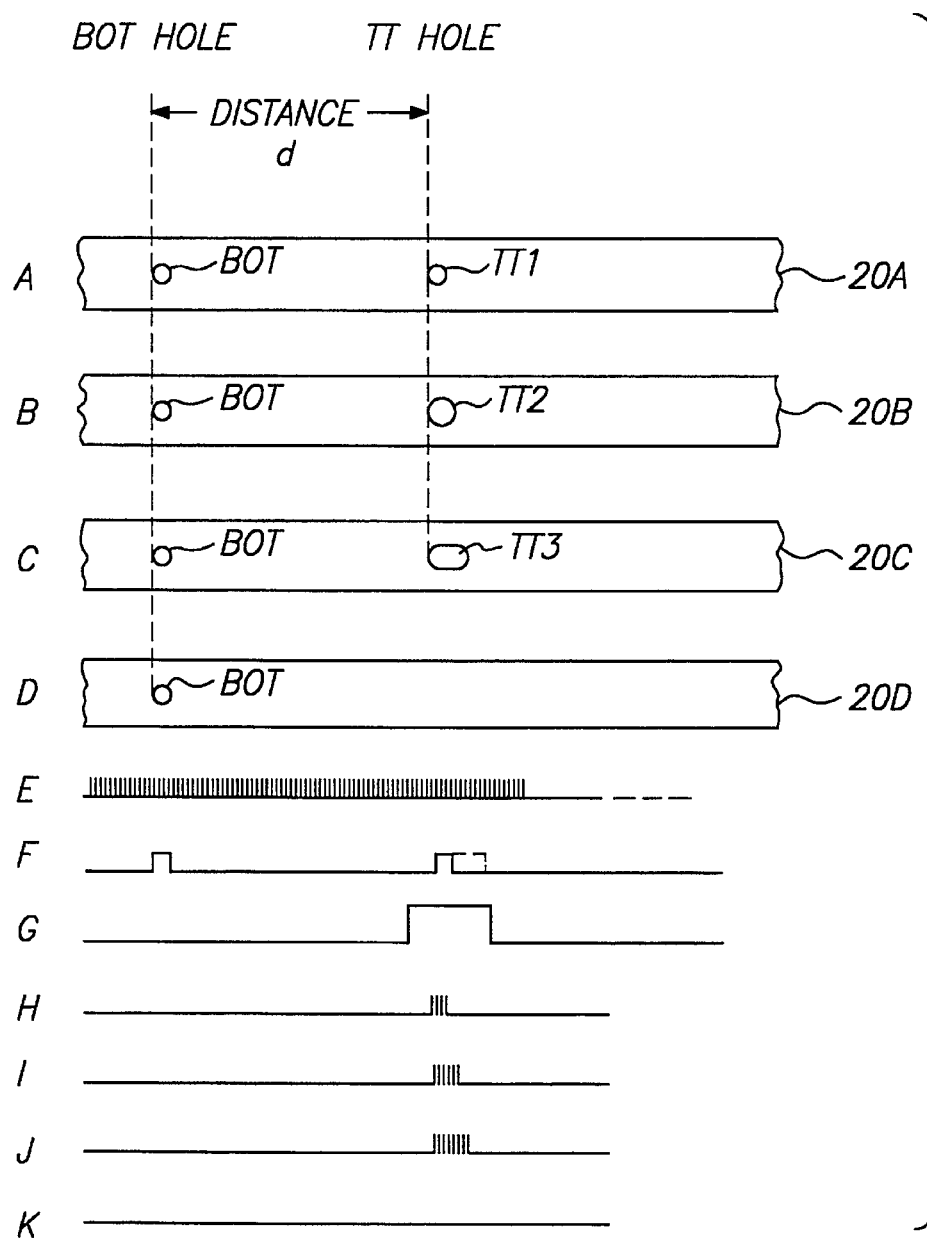
FIG. 3 is a series of diagrams of tapes of differing tape types, showing TT holes located and dimensioned in accordance with principles of the present invention.

Further aspects of the present invention are illustrated in the FIG. 3 graphs. Graph A represents a section of tape 20A having a BOT hole and a tape type hole TT1 spaced a fixed distance d inwardly away from the BOT hole. In accordance with the present invention, the size of tape type hole TT1 is measured by the tape drive assembly 10 in order to determine the type of tape media present within the particular cartridge 22. The fixed distance d is also measured by the tape drive assembly and used to qualify or validate the tape type hole, thereby providing a redundancy check on validity of the particular tape type hole data gathered by the assembly 10.

Graph B represents a second kind of magnetic recording tape 20B, as denoted by a larger tape type hole TT2. Graph C represents yet a third type of magnetic recording tape as denoted by a yet larger tape type hole TT3, which may be round or oval-shaped as shown, so as to extend the duration of the hole in the longitudinal direction without significantly weakening the tape web. In the example of TT3, a longitudinal dimension is made greater than a transverse dimension relative to the longitudinal axis of the tape. Graph D represents a conventional or nominal tape having no tape type hole. This fact is also determined by the tape drive assembly 10 and results in a lowest characteristics format being applied by the format circuit. These various tape type holes are used to denote media which may have the same substrate thicknesses but which have different magnetic properties and storage capacities.

Graph E represents a relatively high frequency clock signal output put out by the tachometer circuit 102. Graph F represents logical signals put out by the tape hole circuit 104 in response to detection of light rays passing through the BOT hole and the TT hole of the tape media. The TT hole will be of a varying duration, depending upon the size of the TT hole, as explained above in connection with Graphs A–D. Graph G represents a tape type hole qualification window which is asserted after a predetermined number of counts of the clock signal following the BOT hole. The duration of the Graph G window is made sufficiently long to cover a largest tape type hole duration. Graph H represents detection of tape type hole TT1 and is figuratively depicted as three clock counts. Graph I represents depiction of tape type hole TT2 and is figuratively depicted as five consecutive clock counts. Graph J represents detection of tape type hole TT3 and is figuratively depicted as seven clock counts. Graph K represents the default case in which no tape type hole is encountered, and results in no clock counts and a default format.

Figure 4:
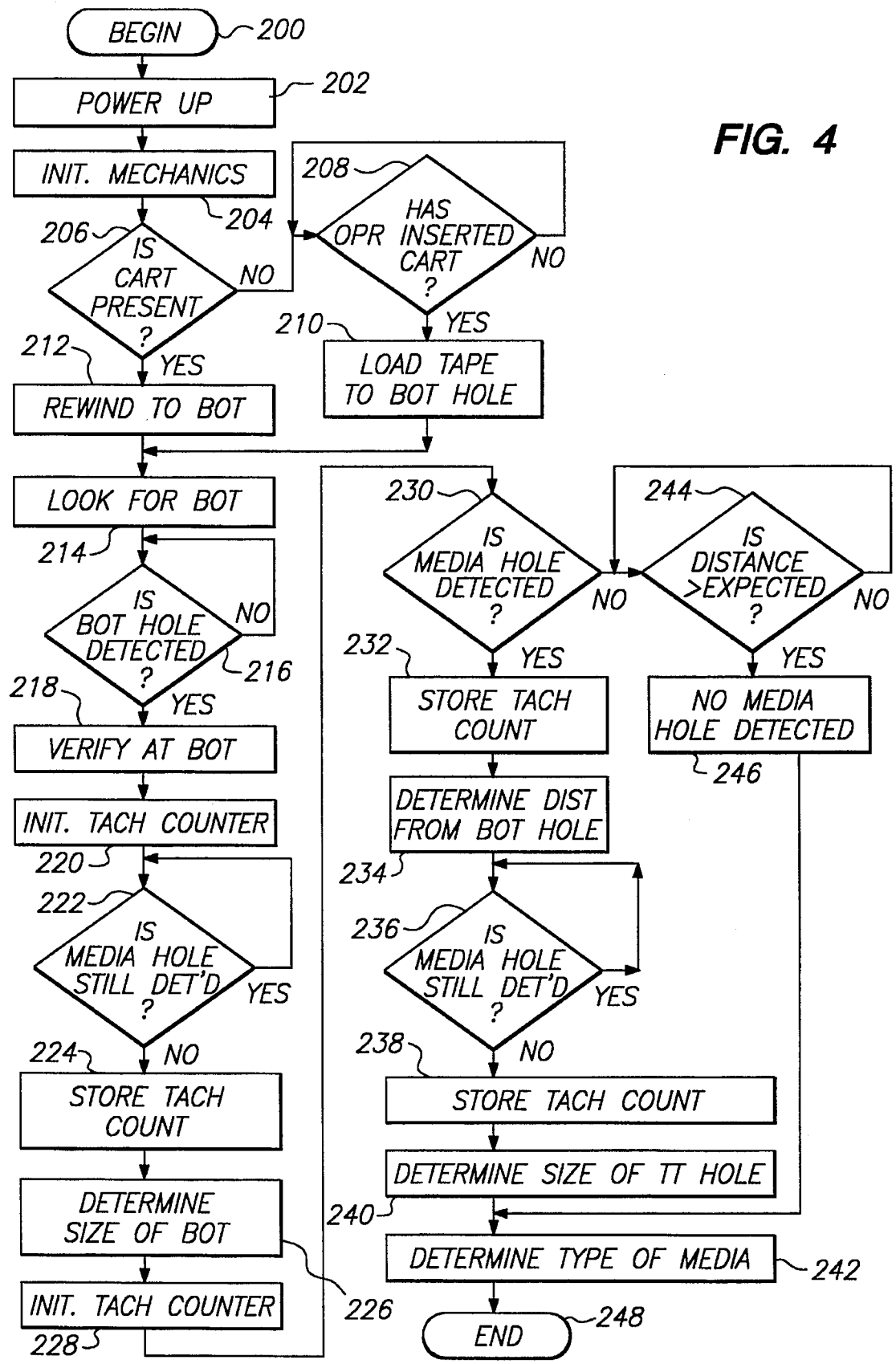
FIG. 4 is a flow chart illustrating a preferred method for detecting and using the BOT/TT holes within the FIGS. 1 and 2 example in accordance with principles of the present invention.

FIG. 4 sets forth a series of process steps and logical nodes carried out by the programmed microcontroller 100 in accomplishing an example of the method of the present invention. The tape type hole process 200 begins at an entry node which may include a power up step 202 which initializes the electronics including the microcontroller 100 and circuits 102, 104 and 106, followed by an initialization of mechanical elements step 204 which initializes the motors 15 and 25, for example. A logical node 206 determines whether a cartridge 22 is present within the cartridge receiver 16 of the tape drive assembly 10. If not, a following logical node 208 effectively loops upon itself until the operator has inserted a tape cartridge 22 into the receiver 16. Once the cartridge 22 is detected within the receiver 16 (as by a suitable sensor such as a micro switch), the tape 20 is engaged and spooled onto the take-up reel 14 until a BOT hole is detected at step 210.

If the cartridge was determined already to be present at the logical node 206, a step 212 rewinds the tape to the BOT hole. Once the approximate location of the BOT hole is established, a substantially constant tape velocity is established by the reel motors 15 and 25 across the optical sensor assembly 90 and a step 214 monitors the tape hole circuit 104 to mark the leading edge of the tape hole signal, graph F of FIG. 3. A logical node 216 then loops until the BOT hole is no longer detected, thereby enabling the BOT hole to be measured. A step 218 then uses measured relative velocities of reels 14 and 24 during the initial spooling operation to verify that the hole being sensed is at the beginning of the tape strand, rather than at the end thereof.

The tachometer counter is initialized at a state 220, and a logical node 222 loops for so long as the BOT hole is detected or until a falling edge of the BOT pulse of graph F of FIG. 3. A step 224 then stores the tachometer count reached during the loop duration of the process node 222, and a step 226 determines the size of the BOT hole (which also may be used by the tape drive assembly 10 to determine tape type or tape/cartridge source). The tachometer counter is then initialized at a step 228, and counting resumes until a TT hole is detected following passage of the length d of tape between the BOT and TT holes.

A logical node 230 monitors the path from the tape hole circuit to determine a rising edge in the graph F of FIG. 3 waveform during the window. When the rising edge denoting beginning of the TT hole is detected at node 232, the tachometer count then reached is stored at a step 232, and the distance d from the BOT hole to the TT hole is then determined at a step 234. This step 234 effectively implements the tape type window depicted as graph G in FIG. 3, in that the distance determined at the step 234 must lie within a predetermined acceptable range, given system and tape tolerances.

A logical node 236 then enters a loop until the tape type hole is no longer detected. The tachometer count reached at the falling edge of the tape type hole is then recorded in a register at a step 238. A process step 240 then determines the size of the tape type hole. A step 242 then compares determined tape type hole size with sizes recorded in a lookup table in order to determine type of tape media (tape 20n) within the cartridge 22. This determination is then used by the format circuit 106 to format the tape type 20n appropriately, given its data storage capacity.

If, at the logical node 230 the tape type media hole is not detected, a logical node 244 is reached which determines whether the distance (represented by accumulated tachometer counts) is greater than the nominal distance d expected between the BOT hole and the TT hole. If not, a loop is entered until that distance has passed by. When it has, a process step 246 determines that no tape type hole has been detected, thereby indicating the default case, illustrated in graphs D and K of FIG. 3. This information is then passed to the process step 242 which thereupon determines media type in the absence of a detected tape type hole.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method for detecting one of a plurality of types of magnetic media tape within a magnetic tape cartridge data storage subsystem, wherein the tape cartridge includes a tape feed reel having the one type of magnetic tape spooled thereon, wherein beginning of tape (BOT) and end of tape (EOT) holes are defined by the tape near respective ends thereof, wherein the subsystem receives the cartridge, engages a BOT end of the tape and spools the tape onto an internal take-up reel, measures tape velocity, measures take-up reel velocity and senses at least the BOT hole, the method comprising the steps of:

a. defining a single tape type (TT) hole within the magnetic tape at a predetermined location transversely aligned with, and proximately close to and longitudinally spaced toward the data storage area of the tape from, the BOT hole, wherein the location relative to the BOT hole is used for qualifying the TT hole, and the size of the TT hole is used for determining tape type, b. sensing the BOT hole, c. measuring a distance from the BOT hole to the TT hole to qualify the TT hole as valid, d. sensing and measuring a duration of the TT hole as a function of its size to determine tape type, and e. formatting the tape with the subsystem in accordance with determined tape type.

2. The method set forth in accordance with claim 1 wherein the step of defining the single TT hole comprises the step of forming a circular hole in the tape having a diameter which is varied in size in order to indicate a particular tape type.

3. The method set forth in accordance with claim 1 wherein the step of defining the single TT hole comprises the step of forming a non-circular hole in the tape with a longitudinal dimension exceeding a transverse dimension.

4. The method set forth in accordance with claim 1 wherein the step of measuring a distance from the BOT hole to the TT hole to qualify the TT hole as valid comprises the steps of:

a. generating a clocking signal, b. counting clock cycles of the clocking signal beginning upon occurrence of the BOT hole and continuing until a predetermined count is reached, and, c. opening a TT hole gate for a predetermined qualification window duration when the predetermined count is reached.

5. The method set forth in accordance with claim 1 wherein the step of sensing and measuring a duration of the TT hole comprises the steps of:

a. generating an analog signal corresponding to duration of the TT hole past an analog sensor, b. converting the analog signal into a logical TT hole duration window, c. accumulating counts of a clocking signal during the TT hole duration window, wherein an accumulated clocking signal count is used to determine tape type.

6. The method set forth in accordance with claim 1 wherein the step of measuring a distance from the BOT hole to the TT hole to qualify the TT hole as valid comprises the steps of:

a. generating a clocking signal having a predetermined clock period shorter than a sensed duration period of the BOT hole, b. counting multiple clock cycles of the clocking signal beginning upon occurrence of the BOT hole and continuing until a predetermined count is reached, and, c. opening a TT hole gate for a predetermined qualification window duration when the predetermined count is reached and wherein the step of sensing and measuring a duration of the TT hole comprises the steps of:

d. generating an analog signal corresponding to duration of the TT hole past an analog sensor, e. converting the analog signal into a logical TT hole duration window, and, f. accumulating counts of the clocking signal during the TT hole duration window, wherein an accumulated clocking signal count is used to determine tape type.

7. A single reel tape cartridge for supplying a stream of one of a plurality of types of magnetic recording tape into a magnetic tape cartridge data storage subsystem, wherein the tape cartridge includes a tape feed reel having the one type of magnetic tape spooled thereon, wherein beginning of tape (BOT) and end of tape (EOT) holes are defined by the tape near respective ends thereof, wherein the subsystem receives the cartridge, engages a BOT end of the tape, spools the tape onto an internal take-up reel, measures tape velocity, measures take-up reel velocity and senses at least the BOT hole, the cartridge comprising:

a magnetic tape having a tape type (TT) hole at a location along the tape between the BOT hole and the EOT hole, and in substantial alignment with a longitudinal axis of alignment of the BOT hole and spaced a fixed longitudinal distance away from the BOT hole, the fixed spacing between the BOT hole and the TT hole serving to qualify the TT hole as valid, the TT hole having one of a predetermined number of TT hole sizes in relation to the BOT hole, the one of the TT hole sizes for identifying said one tape type among said plurality of types of magnetic recording tape.

8. The single reel tape cartridge set forth in claim 7 wherein the TT hole is defined as a circular hole having a diameter which is selected from the predetermined number of TT hole sizes in order to indicate a particular tape type.

9. The single reel tape cartridge set forth in claim 7 wherein the TT hole is defined as a non-circular hole having a longitudinal dimension exceeding a transverse dimension.

10. A cartridge tape data storage and retrieval subsystem for recording and playback of digital user data from a formatted data storage tape of one of a plurality of tape types, the tape cartridge including a tape feed reel having the one type of magnetic tape spooled thereon, the tape defining a beginning of tape (BOT) hole and an end of tape (EOT) hole near respective ends of the spooled tape, the subsystem including structural elements for receiving the cartridge, for engaging a BOT end of the tape, for spooling the tape onto an internal take-up reel, for measuring tape velocity, for measuring take-up reel velocity and for sensing the BOT and EOT holes, the subsystem further comprising:

measurement means responsive to the structural element for sensing the BOT hole for measuring a distance to a tape type (TT) hole defined by the tape proximately close to the BOT hole and spaced away therefrom along a longitudinal tape axis with which the BOT hole is substantially centered, for generating a TT hole location value, qualification means responsive to the measurement means for comparing the TT hole location value with a reference value to qualify the TT hole as valid, TT hole duration measurement means responsive to the qualification means for sensing a duration of the TT hole via the structural element for measuring the BOT hole and for generating a TT hole duration value, tape type determining means for comparing the TT hole duration value with a plurality of prestored TT hole duration reference values, thereby to determine tape type of the one type of magnetic tape.

11. The cartridge tape data storage and retrieval subsystem set forth in claim 10 wherein the subsystem includes tape format means for formatting the one type of magnetic tape in response to determined tape type.

12. The cartridge tape data storage and retrieval subsystem set forth in claim 10 wherein the structural element for sensing the BOT and EOT holes comprises a light source on one size of the tape positioned in alignment with the BOT and EOT holes, and a photodetector aligned to receive light energy from the light source during the passage of the BOT and EOT holes and convert the light energy into an electrical signal.

13. The cartridge tape data storage and retrieval subsystem set forth in claim 12 wherein the TT hole is substantially circular, having a diameter which is varied in size in order to indicate a particular tape type.

14. The cartridge tape data storage and retrieval subsystem set forth in claim 12 wherein the TT hole is non-circular, having a longitudinal dimension greater than a transverse dimension relative to the tape.

* * * * *